US007166028B2

(12) United States Patent
Fasbender et al.

(10) Patent No.: US 7,166,028 B2
(45) Date of Patent: Jan. 23, 2007

(54) GAMING METHOD AND APPARATUS WITH TRIGGERING OF BONUS EVENTS BY THE PRESENCE OF A TRIGGER SYMBOL IN PARTICULAR LOCATIONS

(75) Inventors: Dustin Fasbender, Bozeman, MT (US); David W. Kraft, Bozeman, MT (US); John P. O'Donovan, Bozeman, MT (US)

(73) Assignee: IGT, Reno, NV (US)

(*) Notice: Subject to any disclaimer, the term of this patent is extended or adjusted under 35 U.S.C. 154(b) by 235 days.

(21) Appl. No.: 10/852,830

(22) Filed: May 25, 2004

(65) Prior Publication Data

US 2004/0214634 A1 Oct. 28, 2004

Related U.S. Application Data

(63) Continuation of application No. 09/754,450, filed on Jan. 4, 2001, now abandoned.

(51) Int. Cl.
*A63F 13/00* (2006.01)

(52) U.S. Cl. .......................................................... 463/20

(58) Field of Classification Search .................. 463/13, 463/16, 20, 25; 273/143 R See application file for complete search history.

(56) References Cited

U.S. PATENT DOCUMENTS 1,527,929 A 2/1925 Simons
3,998,462 A 12/1976 Goott
4,743,022 A 5/1988 Wood
4,861,041 A 8/1989 Jones et al.
4,948,134 A 8/1990 Suttle et al.
5,010,995 A 4/1991 Okada
5,019,973 A 5/1991 Wilcox et al.
5,022,653 A 6/1991 Suttle et al.
5,042,818 A 8/1991 Weingardt (Continued)

FOREIGN PATENT DOCUMENTS

EP 0 829 834 3/1998

(Continued)

OTHER PUBLICATIONS

Press Release, WMS Gaming Inc., *WMS Gaming Premieres New Games and Innovative Technologies* (Oct. 18, 2000).

*Primary Examiner*—Kim Nguyen
(74) *Attorney, Agent, or Firm*—Marshall, Gerstein & Borun LLP

(57) ABSTRACT

Gaming methods and devices that include a primary game and a bonus game. In the primary game, one or more paylines of an array are selected. One symbol from a predetermined set is then randomly assigned to each image site of the array. Awards are granted when certain combinations of symbols appear on one or more of the paylines that were selected by the player. A bonus game may be awarded for each selected payline of the primary game on which a triggering event occurs. In each bonus game, one or more of the symbols along the corresponding primary game payline may be randomly replaced with other symbols from the predetermined set. If multiple bonus games are awarded, the bonus games may be played sequentially. An additional bonus event may also be awarded if a triggering event occurs in a predetermined or prespecified location of an array of image sites.

17 Claims, 8 Drawing Sheets

U.S. PATENT DOCUMENTS

| | | | | |
|---|---|---|---|---|
| 5,098,107 | A | | 3/1992 | Boylan et al. |
| 5,100,137 | A | | 3/1992 | Fulton |
| 5,118,109 | A | | 6/1992 | Gumina |
| 5,154,429 | A | | 10/1992 | LeVasseur |
| 5,158,293 | A | | 10/1992 | Mullins |
| 5,167,413 | A | | 12/1992 | Fulton |
| 5,248,142 | A | | 9/1993 | Breeding |
| 5,251,897 | A | | 10/1993 | Fulton |
| 5,255,915 | A | | 10/1993 | Miller |
| 5,257,789 | A | | 11/1993 | LeVasseur |
| 5,265,874 | A | | 11/1993 | Dickinson et al. |
| 5,275,400 | A | | 1/1994 | Weingardt et al. |
| 5,280,915 | A | | 1/1994 | Groussman |
| 5,288,082 | A | | 2/1994 | Marquez |
| 5,294,120 | A | | 3/1994 | Schultz |
| 5,308,065 | A | | 5/1994 | Bridgeman et al. |
| 5,324,041 | A | | 6/1994 | Boylan et al. |
| 5,356,140 | A | | 10/1994 | Dabrowski et al. |
| 5,413,353 | A | | 5/1995 | Demarest et al. |
| 5,415,404 | A | | 5/1995 | Joshi et al. |
| 5,489,101 | A | | 2/1996 | Moody |
| 5,531,441 | A | | 7/1996 | Dabrowski et al. |
| 5,531,448 | A | | 7/1996 | Moody |
| 5,542,669 | A | | 8/1996 | Charron et al. |
| 5,544,892 | A | | 8/1996 | Breeding |
| 5,570,885 | A | | 11/1996 | Ornstein |
| 5,573,249 | A | | 11/1996 | Johnson |
| 5,586,766 | A | | 12/1996 | Forte et al. |
| 5,653,444 | A | | 8/1997 | Dahl |
| 5,678,821 | A | | 10/1997 | Hedman |
| 5,697,614 | A | | 12/1997 | Potter et al. |
| 5,711,525 | A | | 1/1998 | Breeding |
| 5,718,431 | A | | 2/1998 | Ornstein |
| 5,725,216 | A | | 3/1998 | Jones |
| 5,732,950 | A | | 3/1998 | Moody |
| 5,755,621 | A | | 5/1998 | Marks et al. |
| 5,772,506 | A | | 6/1998 | Marks et al. |
| 5,775,692 | A | | 7/1998 | Watts et al. |
| 5,779,545 | A | | 7/1998 | Berg et al. |
| 5,788,241 | A | | 8/1998 | Ung |
| 5,788,574 | A | | 8/1998 | Ornstein et al. |
| 5,794,934 | A | | 8/1998 | Malcolm |
| 5,799,946 | A | | 9/1998 | Groussman |
| 5,816,916 | A | | 10/1998 | Moody |
| 5,820,460 | A | | 10/1998 | Fulton |
| 5,823,873 | A | | 10/1998 | Moody |
| 5,823,874 | A | | 10/1998 | Adams |
| 5,833,536 | A | | 11/1998 | Davids et al. |
| 5,839,730 | A | | 11/1998 | Pike |
| 5,848,932 | A | | 12/1998 | Adams |
| 5,851,148 | A | | 12/1998 | Brune et al. |
| 5,882,259 | A | | 3/1999 | Holmes, Jr. et al. |
| 5,882,261 | A | | 3/1999 | Adams |
| 5,897,436 | A | | 4/1999 | Singer et al. |
| 5,902,983 | A | | 5/1999 | Crevelt et al. |
| 5,911,418 | A | | 6/1999 | Adams |
| 5,921,550 | A | | 7/1999 | Awada |
| 5,934,998 | A | | 8/1999 | Forte et al. |
| 5,944,314 | A | | 8/1999 | Stavinsky |
| 5,947,821 | A | | 9/1999 | Stone |
| 5,947,822 | A | | 9/1999 | Weiss |
| 5,951,012 | A | | 9/1999 | Feola |
| 5,951,397 | A | | 9/1999 | Dickinson |
| 5,954,335 | A | | 9/1999 | Moody |
| 5,964,464 | A | | 10/1999 | Jones |
| 5,967,894 | A | | 10/1999 | Kinoshita et al. |
| 5,976,016 | A | * | 11/1999 | Moody et al. ................ 463/13 |
| 5,984,309 | A | | 11/1999 | Santin |
| 5,988,643 | A | | 11/1999 | Awada |
| 5,997,002 | A | | 12/1999 | Goldman |
| 6,007,066 | A | | 12/1999 | Moody |
| 6,012,719 | A | | 1/2000 | Webb |
| 6,012,720 | A | | 1/2000 | Webb |
| 6,019,374 | A | | 2/2000 | Breeding |
| 6,033,307 | A | | 3/2000 | Vancura |
| 6,039,648 | A | | 3/2000 | Guinn et al. |
| 6,045,129 | A | | 4/2000 | Cooper et al. |
| 6,050,568 | A | | 4/2000 | Hachquet |
| 6,056,641 | A | | 5/2000 | Webb |
| 6,059,289 | A | | 5/2000 | Vancura |
| 6,059,658 | A | | 5/2000 | Mangano et al. |
| 6,062,980 | A | | 5/2000 | Luciano |
| 6,089,976 | A | | 7/2000 | Schneider et al. |
| 6,089,977 | A | | 7/2000 | Bennett |
| 6,098,985 | A | | 8/2000 | Moody |
| 6,110,040 | A | | 8/2000 | Sanduski et al. |
| 6,120,378 | A | | 9/2000 | Moody et al. |
| 6,129,357 | A | | 10/2000 | Wichinsky |
| 6,131,907 | A | | 10/2000 | Nucifora et al. |
| 6,131,908 | A | | 10/2000 | Palmer |
| 6,132,311 | A | | 10/2000 | Williams |
| 6,135,453 | A | | 10/2000 | Srichayaporn |
| 6,135,882 | A | | 10/2000 | Kadlic |
| 6,135,883 | A | | 10/2000 | Hachquet |
| 6,146,271 | A | | 11/2000 | Kadlic |
| 6,149,157 | A | | 11/2000 | Suan |
| 6,149,521 | A | | 11/2000 | Sanduski |
| 6,155,568 | A | | 12/2000 | Franklin |
| 6,155,925 | A | | 12/2000 | Giobbi et al. |
| 6,159,095 | A | | 12/2000 | Frohm et al. |
| 6,159,097 | A | | 12/2000 | Gura |
| 6,164,652 | A | | 12/2000 | Lauretta et al. |
| 6,176,781 | B1 | | 1/2001 | Walker et al. |
| 6,179,293 | B1 | | 1/2001 | Hedman |
| 6,203,428 | B1 | | 3/2001 | Giobbi et al. |
| 6,203,429 | B1 | | 3/2001 | Demar et al. ................. 463/20 |
| 6,206,374 | B1 | | 3/2001 | Jones |
| 6,206,780 | B1 | | 3/2001 | Awada |
| 6,220,959 | B1 | | 4/2001 | Holmes et al. ............... 463/13 |
| 6,220,960 | B1 | | 4/2001 | Kryzhanovsky |
| 6,224,055 | B1 | | 5/2001 | Walker et al. |
| 6,231,442 | B1 | | 5/2001 | Mayeroff |
| 6,237,916 | B1 | | 5/2001 | Webb |
| 6,248,016 | B1 | | 6/2001 | Walker et al. |
| 6,250,685 | B1 | | 6/2001 | Walker et al. |
| 6,257,979 | B1 | | 7/2001 | Walker et al. |
| 6,270,079 | B1 | | 8/2001 | Chamberlain |
| 6,283,855 | B1 | | 9/2001 | Bingham |
| 6,299,170 | B1 | | 10/2001 | Yoseloff |
| 6,322,445 | B1 | | 11/2001 | Miller ......................... 463/13 |
| 6,332,839 | B2 | | 12/2001 | Walker et al. |
| 6,334,613 | B1 | | 1/2002 | Yoseloff |
| 6,334,614 | B1 | | 1/2002 | Breeding |
| 6,336,859 | B2 | | 1/2002 | Jones et al. |
| 6,342,007 | B1 | | 1/2002 | Wood et al. |
| 6,345,823 | B1 | | 2/2002 | Webb |
| 6,368,214 | B1 | | 4/2002 | Luciano |
| 6,371,851 | B1 | | 4/2002 | Singer et al. |
| 6,402,150 | B1 | | 6/2002 | Jones |
| 6,405,174 | B1 | | 6/2002 | Walker et al. |
| 6,406,023 | B1 | | 6/2002 | Rowe |
| 6,409,173 | B1 | | 6/2002 | Tri |
| 6,409,174 | B1 | | 6/2002 | Demarest |
| 6,416,407 | B1 | | 7/2002 | Carrico et al. |
| 6,428,002 | B1 | | 8/2002 | Baranauskas |
| 6,435,506 | B1 | | 8/2002 | Piccoli |
| 6,443,456 | B1 | | 9/2002 | Gajor ......................... 273/303 |
| 6,461,240 | B1 | | 10/2002 | Perkins |
| 6,478,675 | B1 | | 11/2002 | Awada |
| 6,517,432 | B1 | * | 2/2003 | Jaffe .......................... 463/16 |
| 6,547,242 | B1 | | 4/2003 | Sugiyama et al. ...... 273/142 R |
| 6,595,852 | B2 | | 7/2003 | Wang |
| 6,729,621 | B2 | | 5/2004 | Moody |
| 2003/0130024 | A1 | | 7/2003 | Darby ......................... 463/13 |

2004/0033830 A1 2/2004 Gold et al.
2004/0043807 A1 3/2004 Pennington

FOREIGN PATENT DOCUMENTS

EP 1 063 622 12/2000
GB 2390822 1/2004
WO WO 97/27570 7/1997

* cited by examiner

GAMING METHOD AND APPARATUS WITH TRIGGERING OF BONUS EVENTS BY THE PRESENCE OF A TRIGGER SYMBOL IN PARTICULAR LOCATIONS

This application is a continuation of U.S. application Ser. No. 09/754,450, filed Jan. 4, 2001, now abandoned, which application is hereby incorporated by reference in its entirety in the present application.

BACKGROUND OF THE INVENTION

1. Field of the Invention

The present invention relates generally to gaming methods and apparatus and, more specifically, to gaming methods and apparatus include primary games and bonus events. In particular, the gaming methods and apparatus of the present invention are configured to award one or more bonus events upon the occurrence of a triggering event in the form of a selected image in one or more predetermined locations of an array of image sites.

2. Background of the Related Art

Gaming devices for playing games of chance, including mechanical, electro-mechanical, and electronics slot machines, or reel type gaming, devices, electronic card game devices, and their methods of operation are well known.

Initiating a game can be done by simply inserting into gaming device some means of payment, such currency (i.e a coin or paper money), a coupon, by electronic funds transfer, such as by of a credit or debit card, as disclose in U.S. Pat. No. 5,902,983, or by use of a so-called "smart card" that includes a programmed microchip or magnetic strip coded with the cardholder's identification and credit to totals, such as that disclosed in U.S. Pat. No. 5,265,874, the disclosure of which is hereby incorporated in its entirety by this reference.

Some gaming devices and methods entice and retain with the possibility of receiving a bonus of increased award amounts or addition play in the way of bonus games. These bonus awards and games, which take a variety of forms, are available in many types of gaming devices and methods, including slot machines and other reel type gaming devices, as well as in card gaming devices.

Among known slot machines are gaming devices that include bonus components for determining whether an award to a player based on the results of a primary game will be increased and, if so, the amount such an award will be increased. Such bonus components include ancillary spinning wheels, as disclosed in U.S. Pat. Nos. 5,848,932, 5,823,874, and 6,059,658, and pinball type devices including ancillary spinning wheels, as taught in U.S. Pat. No. 5,882,261. The spinning wheels of these devices indicate whether an award based on the primary slot game of these devices will be increased and, if so, the amount of award increase that will be provided to the player.

Slot machine payouts may also be increased in accordance with bonus events of other types of games of chance, such as the player-interactive video game disclosed in U.S. Pat. No. 6,159,097 and the automated game-of-chance video of U.S. Pat. No. 6,155,925. In each of these devices and their accompanying methods, the bonus event is triggered by the appearance of a trigger symbol or a certain combination of symbols on a payline.

Another type of slot machine and method in which a bonus event may be made available to a player is described in U.S. Pat. Nos. 6,033,307 and 6,059,289. This type of slot machine includes a single payline in which the appearance of a trigger symbol initiates a bonus game, in this case another single slot machine payline.

U.S. Pat. Nos. 6,120,378 and 5,976,016 disclose electronic, reel type gaming methods in which a player is permitted to select, by way of placing wagers, a number of paylines, up to a maximum number, that will be played. Symbols are randomly assigned to a first payline and an award is granted to the player if one of several predetermined winning combinations of symbols is present along the payline. One or more symbols from the first payline may be selected by the player to be held over to the remaining paylines upon which wagers were previously placed. The remaining symbols of each payline are then replaced with randomly selected symbols. Awards for each additional payline are also provided to the player based on the combinations of symbols present thereon.

Bonus awards are also available in card game type devices. For example, in U.S. Pat. No. 5,911,418, a video poker game and accompanying method are described in which an award may be increased based on the results of a spin of an ancillary spinning wheel.

In conventional "double-down stud" gaming devices and methods, as disclosed in U.S. Pat. Nos. 5,820,460, 5,411,257, 5,251,897, and 5,167,413, a hand of five cards is dealt, with the faces of one or more of the cards not being shown to the player. Based on the cards that are made visible to the player and prior to making the remaining cards visible to the player, the player may choose to wager an additional amount, thereby increasing the amount of winning that are available to the player.

U.S. Pat. No. 5,851,148 discloses a single hand poker gaming device and method in which the number of cards of each face value that have been dealt is recorded. Bonus awards are provided upon reaching certain milestones, such as upon the dealing of a certain number of cards of one or more face values over the course of a series of games.

As another example of bonus awards or other bonus events in card games, U.S. Pat. No. 6,149,521 describes a gaming device in which a poker hand is dealt. Certain awards may be provided to a player upon receiving certain hands, or winning combinations of cards. The award may be increased based on another card that has been dealt with certain winning combinations. For example, if a winning combination of four-of-a-kind is dealt to a player, the base award for such a winning combination may be multiplied by a value assigned to the remaining card of the hand (e.g., the face value of a numbered card, 11 for a Jack, 12 for a Queen, 13 for a King, and 15 for an Ace).

Other poker type gaming methods, such as those disclosed in U.S. Pat. Nos. 6,098,985, 6,007,066, 5,823,873, 5,816,916, and 5,732,950, allow a player to select, by way of placing wagers, a number of "hands" of cards, up to a maximum number, that will be played. A first, "five card stud" hand of cards is dealt to the player. An award for the first hand is determined based on the combination of cards present in the hand. The player is also permitted to select one or more cards, up to four cards, from the first hand that will be held over to any additional hands of cards upon which a wager was previously placed. The remaining cards for each hand are then replaced with other, undealt cards that remain in the deck. In a variation of this method, the remaining cards for each additional hand may be correspondingly positioned cards that are provided from hands that are dealt at roughly the same time as the first hand. Each additional hand, therefore, is a "five card draw" hand, in which the held cards are some of the cards that were dealt in the original hand. Awards for each additional hand are also provided to the player based on the results of the additional hands.

Gaming devices or methods are not known in which two different types of bonus events, such as bonus games and the bonus of increased awards, may be made available to a player. Nor are gaming devices or methods in which the results of multiple, concurrently played primary games may be monitored for a triggering event and a bonus game similar in type to the primary game may be awarded if the triggering event occurs in one or more of the concurrently played primary games.

SUMMARY OF THE INVENTION

The present invention includes a gaming method providing a primary game in conjunction with one or more bonus games, as well as apparatus for effecting the method. In the primary game, a player selects, from an array of symbols to be randomly generated, one or more paylines along which the game will be played. The array of symbols is then generated and displayed. If a trigger symbol is present along one or more of the selected paylines, one or more bonus games may be initiated. In addition, the presence of a trigger symbol in a specified location within the array, such as at the center, may cause another bonus event to occur. For example, a part of the payout or the total payout of game may be increased as a result of the additional bonus event.

In order to initiate the primary game on an apparatus according to the invention, a player first selects certain paylines by, for example, placing wagers, or bets, on each selected payline of an array of symbols, such as poker card symbols or reel type slot machine type symbols. Once the player has indicated that each desired payline has been selected, the symbols from a predetermined set of symbols are randomly generated and displayed in an array of fixed size comprising, for example, one or more rows and columns of symbols. The symbols present along each payline are examined to determine whether any winnings, such as tournament qualification points, tournament points, or a monetary payout, will be awarded to the player.

Each payline is also examined to determine whether the trigger symbol is present along that payline. If so, the game progresses to one or more bonus rounds. For example, the gaming method may award to the player a single round of bonus play if the trigger symbol is present in at least one payline that was previously selected by the player. Alternatively, a bonus round of play may be awarded to the player for each payline in which the trigger symbol is present. While the game of each bonus round is preferably related in some way to the primary game (i.e., a card type bonus game resulting form a card type primary game), types of bonus round games differing from the primary game are also within the scope of the present invention.

In addition to the possibility of receiving the opportunity to play a bonus game based on the presence of a trigger symbol in a selected payline, a bonus event may also occur if the trigger symbol appears in one or more specified locations (e.g., at the center) of the array of symbols. The bonus event may comprise one or more bonus games, an increase in the player's winnings along one or more of the selected paylines of the primary game, or a combination thereof.

Gaming machines and other apparatus for effecting gaming methods of the present invention are also within the scope of the present invention. Such apparatus may be electronic or electro-mechanical systems which include or communicate with a processor under control of a suitable computer program, as well as components for displaying to a player the array of symbols and other information associated with the primary game and bonus event, player interface components, and components for receiving payment from a player and for providing payment of monetary awards to the player. Apparatus incorporating teachings of the present invention may comprise individual player stations of the stand-alone type, or player stations that are networked with a central computer or with one or more other player stations.

Other features and advantages of the present invention will become apparent to those of ordinary skill in the art through a consideration of the ensuing description, the accompanying drawings, and the appended claims.

BRIEF DESCRIPTION OF THE DRAWINGS

In the drawings, which illustrate exemplary embodiments of the present invention and in which like reference characters denote like elements.

DETAILED DESCRIPTION

Figure 1:
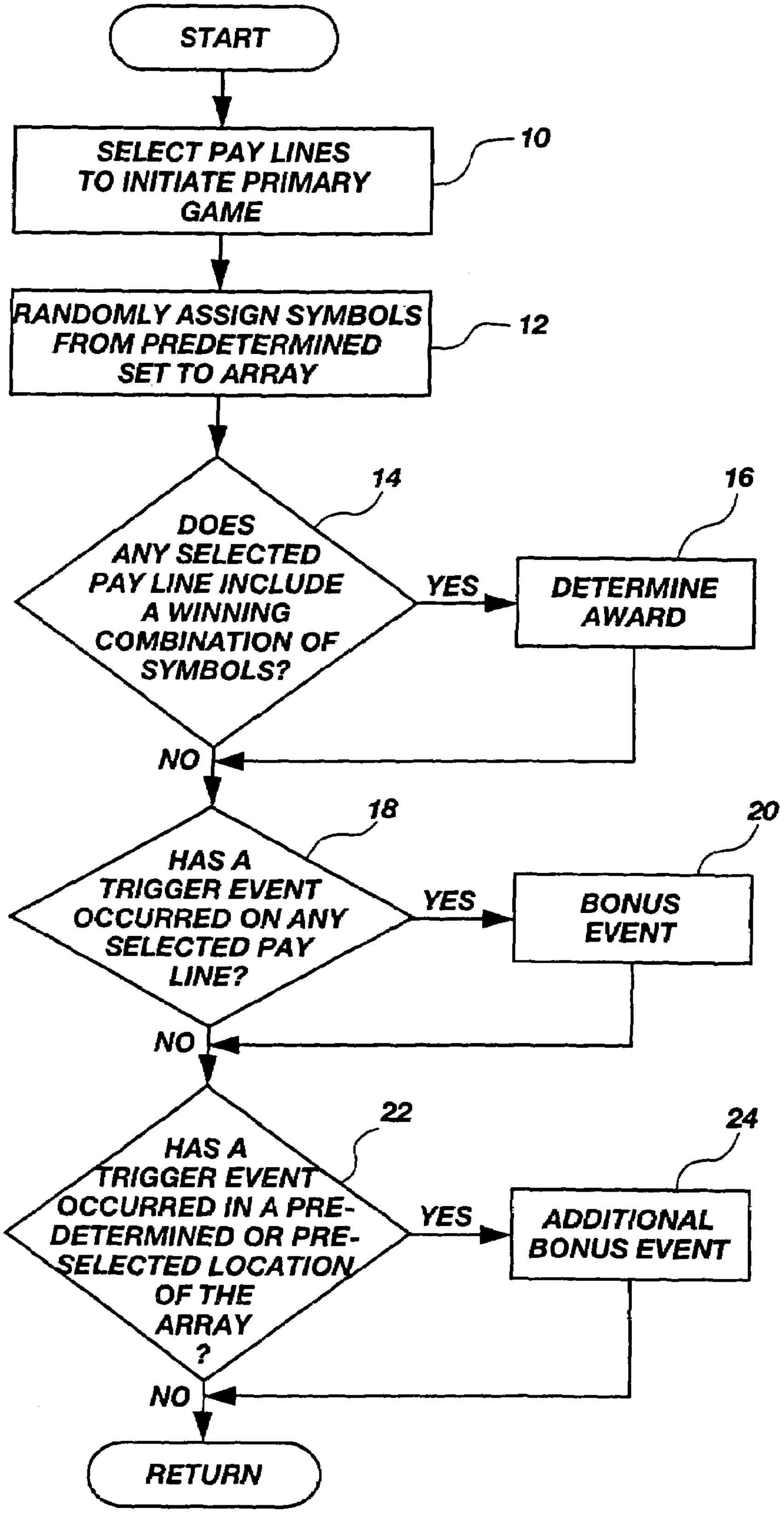
FIG. 1 is a flow chart depicting a broad aspect of one embodiment of the method of the present invention.
Figure 2:
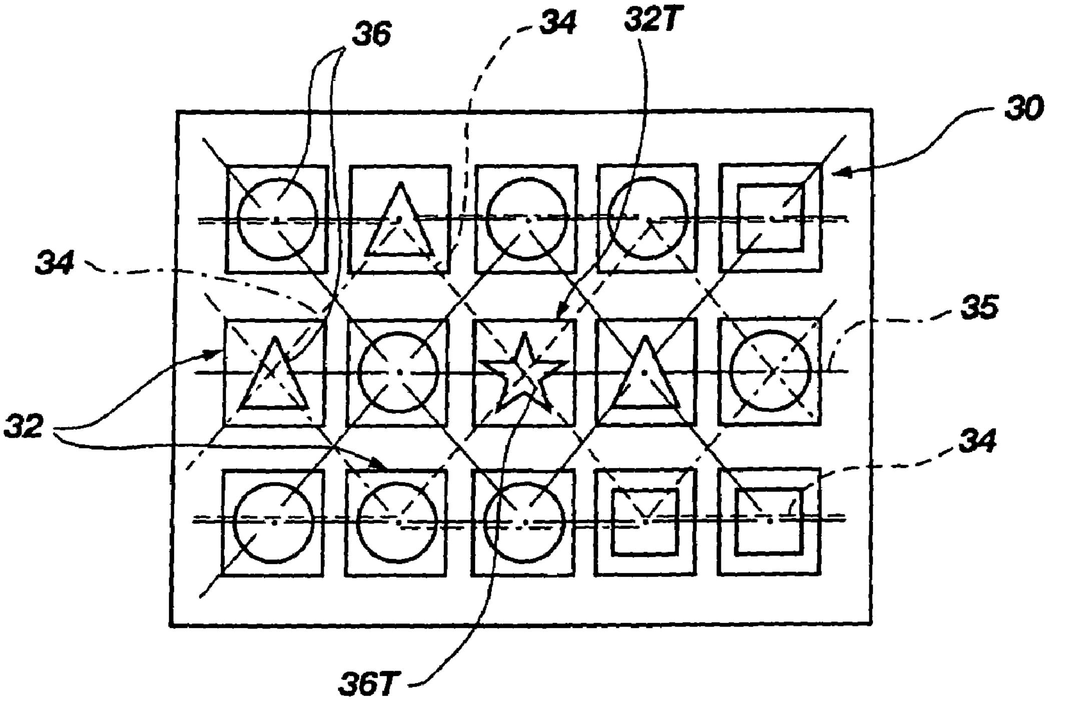
FIGS. 2 and 3 are schematic representations illustrating basic, possible events that may occur in effecting the embodiment of the method depicted in FIG. 1.
Figure 3:
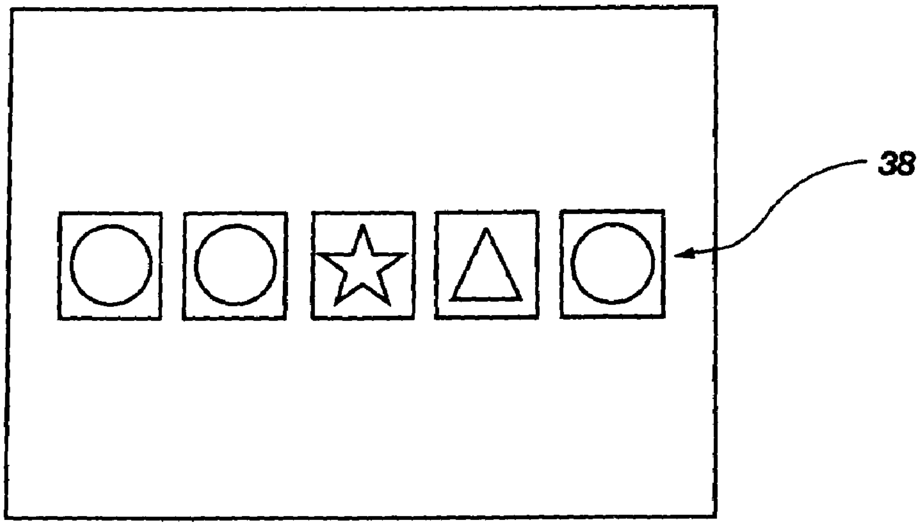

The flow chart of FIG. 1, along with FIGS. 2 and 3, illustrate a broad, exemplary aspect of the gaming method of the present invention. In the gaming method, a player initiates a primary game, at reference character 10 of FIG. 1 and as shown in FIG. 2, by selecting one or more paylines 34 on an array 30 of image sites 32. As depicted in FIG. 2, there are nine different paylines 34, identified for clarity by various broken lines, across array 30, each including five image sites 32. While a 3×5 rectangular array is depicted, arrays with different numbers of symbols and of other arrangements are also within the scope of the present invention. Once the desired paylines 34, which are referred to herein as "selected" paylines 35, have been chosen by the player, a symbol 36 from a predetermined set of symbols is randomly generated and displayed at each image site 32 of array 30, as shown at reference character 12 of FIG. 1. The symbols 36 along each selected payline 35 may be fixed at the initial display or the player may be provided with an opportunity to have symbols 36 at one or more image sites 32 along one or more selected paylines 35 randomly replaced with different or other symbols 36 from the predetermined set.

At reference character 14, each symbol 36 along each selected payline 35 is examined to determine whether the player should receive a predetermined award. If a winning combination of symbols 36 is present on a given payline, process flows to reference character 16 of FIG. 1, where the player may receive an award based upon the particular winning combination of symbols 36. Exemplary awards include, but are not limited to, cash, monetary credits, tournament qualification points, or tournament points. An award for the presence of a certain combination of symbols 36 on a selected payline 35 may be granted immediately or withheld until a determination is made as to whether the payline qualifies the player for a bonus round or until a bonus round, if awarded, is complete.

Next, at reference character 18 of FIG. 1, each selected payline 35 is "examined" for the presence of an established trigger symbol 36T (FIG. 2) or other bonus round triggering event, such as one or more predetermined triggering combinations of symbols 36 thereon. If trigger symbol 36T is present along any selected payline 35 or another triggering event occurs, play proceeds to a bonus round, at reference character 20 of FIG. 1. Alternatively, for the possibility of receiving a substantially increased award, the player may be provided with the opportunity to proceed to the bonus round in lieu of receiving an award based on the combination of symbols 36 present (e.g., by wagering the primary game award for the corresponding selected paylines 35) along each selected payline 35 in which trigger symbol 36T is present or in which another triggering event occurs.

In the bonus round, an exemplary embodiment of which is depicted in FIG. 3, play continues along a single bonus payline 38. As will be discussed hereinafter in further detail, none, one or more symbols 36 from the selected payline 35 in the primary game that qualified the player for the bonus round may be retained in bonus payline 38, while at least one symbol 36 from selected payline 35 is replaced, through random generation, with another symbol from the predetermined set or from a "fresh" set of symbols 36, which preferably includes the same symbols 36 as the predetermined set. As an alternative, a different set of symbols may be used in the bonus round, such as the symbols typically associated with a slot machine or other reel type game. Bonus payline 38 is examined, in a similar manner as that in which each selected payline 35 is examined, to determine whether or not a "winning" combination of symbols 36 is present thereon. If so, the player may be granted a bonus award in addition to or in lieu of any award based on the results of the primary game, or the award from the primary game may be increased. The amount of the bonus award or the amount of the award increase that occurs as a result of the bonus game is preferably based on the results of the bonus game.

At reference character 22 of FIG. 1, a determination is made as to whether trigger symbol 36T is present at a specified image site within array 30, which is referred to herein as trigger site 32T. If so, at reference character 24 of FIG. 1, a bonus event may occur automatically, or the player may decide to proceed to a bonus event in lieu of an award based on the results of the primary game. The bonus event may include a bonus round of play, as described with reference to both FIG. 3 and reference character 20 of FIG. 1, or an increase of an award based on results of one or both of the primary game and any bonus games. This bonus event may be granted even if trigger site 32T in which trigger symbol 36T appears is not located in a selected payline 35.

While the flow chart of FIG. 1 illustrates the elements of the inventive method in a particular, exemplary order, any order of execution that is suitable for effecting the broadest aspects of the method of the present invention is within the scope of the present invention.

FIGS. 4–10 depict specific, exemplary embodiments of the methods and gaming devices of the present invention. In one exemplary embodiment of a method incorporating teachings of the present invention, illustrated in FIGS. 4–6, the predetermined set of symbols 36 includes one of each card 36' of a deck of playing cards (e.g., poker cards), with each card 36' comprising a different symbol 36. In the example of a deck of poker cards, the number of symbols 36 in the predetermined set may be fifty-two different symbols 36, or cards 36', if no jokers or other "wild cards" are included, or one additional symbol 36 for each joker or other wild card included in the deck.

Figure 4:
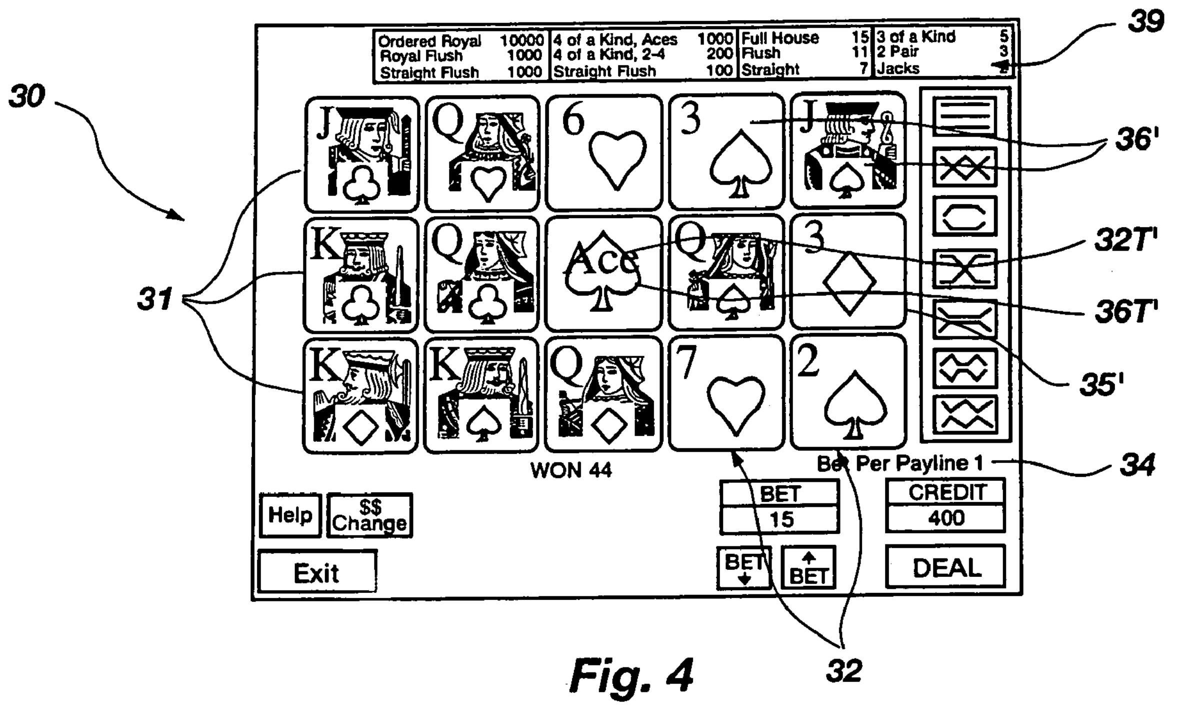
FIG. 4 is a schematic representation of a primary game of an exemplary, poker embodiment of the method of the invention, wherein the primary game is stud poker.

As illustrated in FIG. 4, the primary game is in the form of single deck stud poker, although the primary game may, alternatively, be draw poker. The displayed array 30 includes three rows 31 of image sites 32, each row including five image sites 32. As shown, a player can select from one or more of fifteen different paylines 34, each of which includes five image sites 32, although variations of this embodiment could include different numbers of available paylines 34 with different paths through array 30 of image sites 32. The one or more paylines 34 are selected as known in the art, such as by wagering, or betting, at least a fixed minimum amount of money credits (e.g., one credit) or tournament points to pick each selected payline 35. Once a player indicates that all of the desired paylines 34 have been selected, cards 36' are dealt from the single, digital deck of cards, with one card 36' from the deck being assigned to each image site 32 of array 30.

When the primary game is stud poker, once a "hand" of cards 36' have been dealt, each selected payline 35 is examined to determine whether the combination of cards 36' thereon comprises a winning hand. For example, certain known combinations of winning cards, including, without limitation, an ordered royal flush (a type of winning poker hand unique to gaming devices), a royal flush, a straight flush, four-of-a-kind, a full house, a flush, a straight, three-of-a-kind, two pair, and certain pairs of cards, may comprise a winning hand. The amount of award provided to the player for receiving a winning hand on a particular selected payline 35 preferably corresponds to the combination of cards 36' along that selected payline 35, and may be determined by referring to a pay table 40, such as that depicted in FIG. 4, suitable for the type of primary game being played.

Figure 4A:
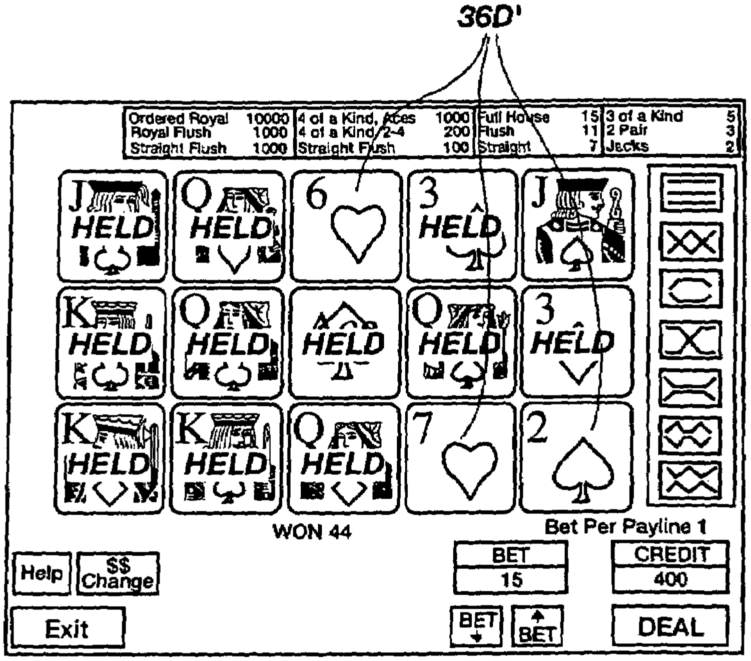
FIGS. 4A–4B are schematic representations of a variation of the method of FIG. 4, wherein the method includes a primary game of draw poker.
Figure 4B:
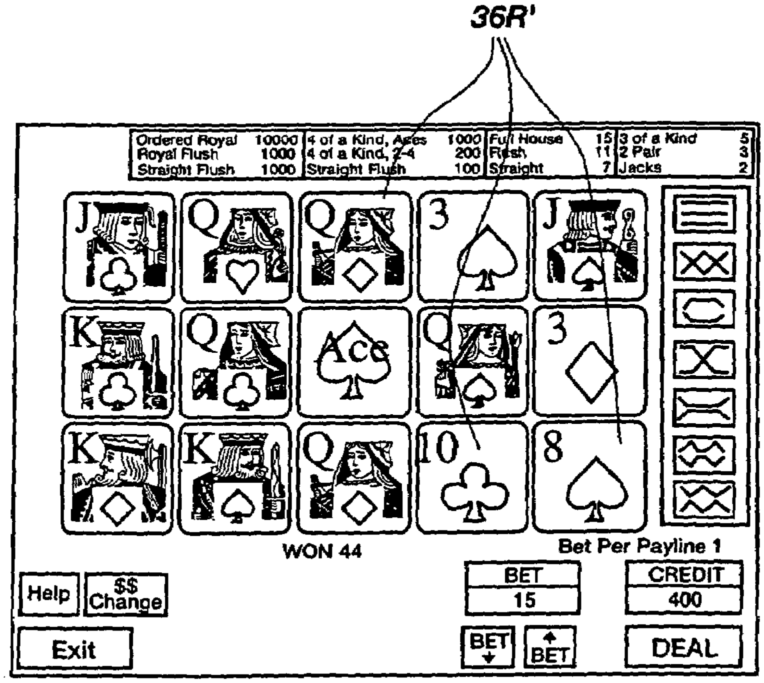

Optionally, as shown in FIGS. 4A and 4B, if the primary game is draw poker, the player may discard one or more cards 36D' along one or more of selected paylines 35, which are then replaced with other cards 36R' from the deck. Again, an award may be provided to the player based on the combination of cards 36' present along each selected payline 35.

If in the primary game, a trigger card 36T' is present in a selected payline 35, play may automatically proceed to a bonus round or the player may decide to proceed to the bonus round in lieu of receiving all or part of an award based on the results of the primary game. For example, if the player chooses to proceed to a bonus round, the player may be required to "wager" all or part of an award for one or more of the selected paylines 35 in which trigger card 36T' appears, or the player may have to bet all or part of a cumulative award based on all of the selected paylines 35 for a given hand. Although trigger card 36T' is depicted in FIG. 4 as the "Ace of Spades", trigger card 36T' may be any other predetermined card 36' and may be preselected by the player. As an alternative to the use of a trigger card, another predetermined triggering event, such as the presence of a certain combination of cards 36' along a selected payline 35, may qualify a player for a bonus round.

Figure 5:
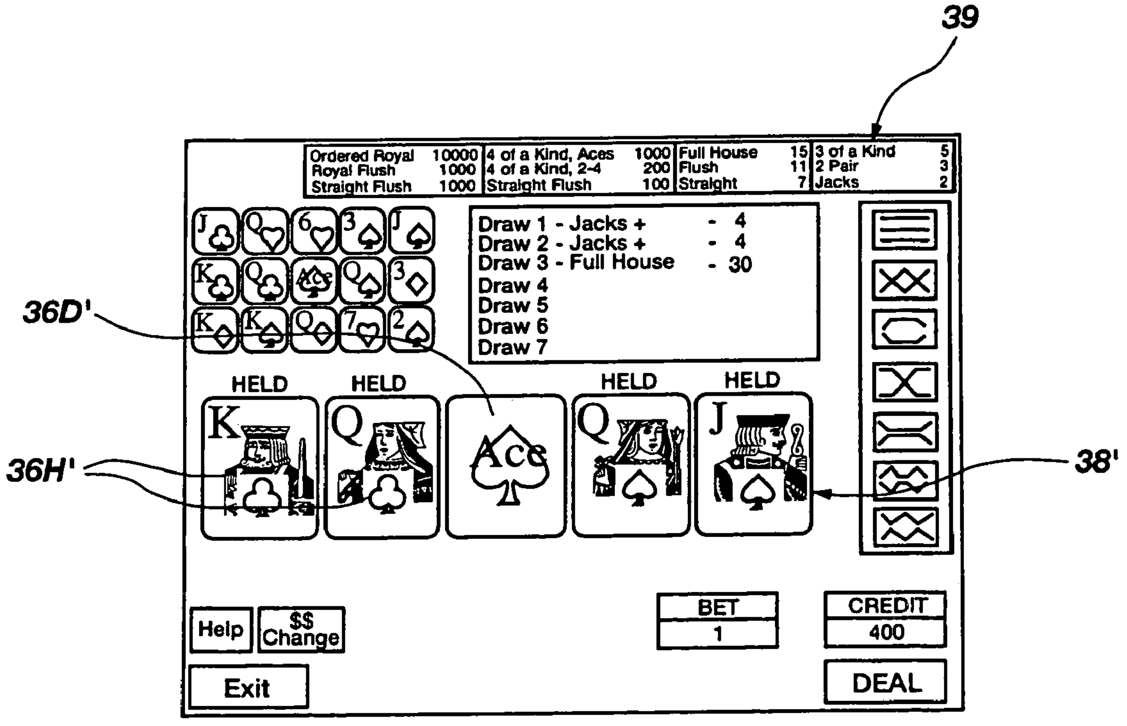
FIGS. 5 and 6 are schematic representations of a bonus game of the exemplary, poker embodiment of the methods illustrated in FIG. 4 and in FIGS. 4A–B, wherein the bonus game is draw poker.
Figure 6:
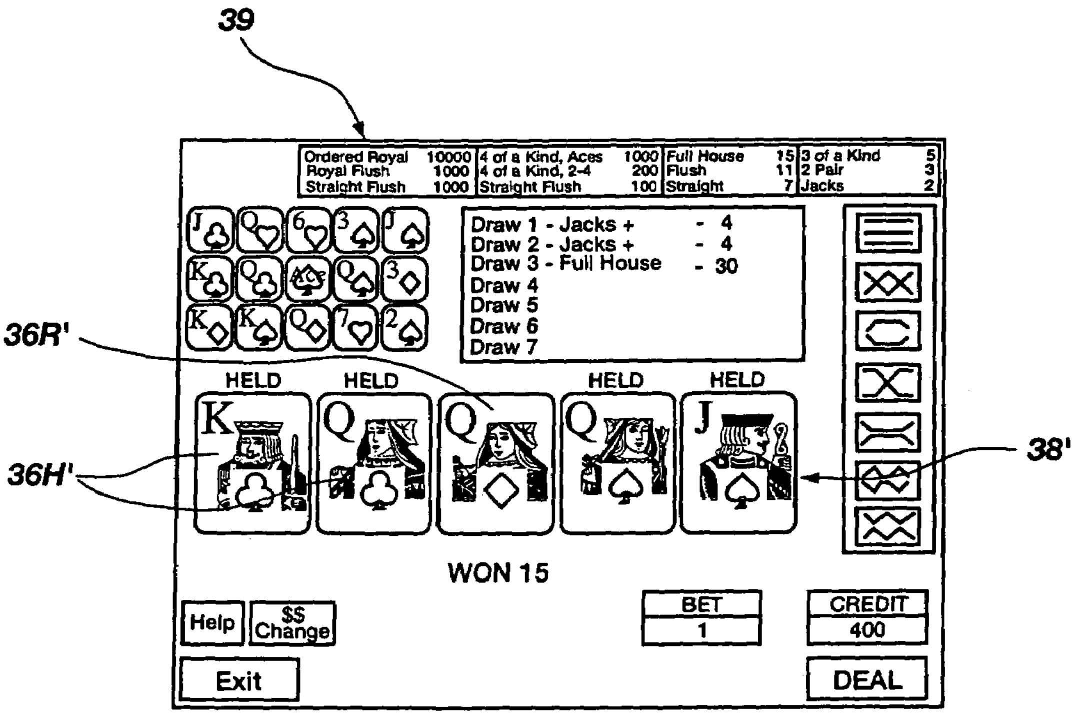

When play proceeds to a bonus round, as shown in FIG. 5, a bonus game is played. In the example depicted in FIG. 5, the bonus game is draw poker, with cards 36' of the original, dealt draw poker hand on bonus payline 38 being the same cards 36' as those that were present in a corresponding selected payline 35 from the primary game. As shown in FIGS. 5 and 6, the player may then decide which cards 36H' to hold, while discarding the remaining cards 36D', which may then be randomly replaced with other, previously undealt cards 36R' from the same deck or from a "fresh" deck which may include the same number and types of cards 36' as the deck use in the primary game. Again, the amount of the award or award increase provided to the player based on the results of each bonus game may correspond to the final combination of cards 36' present in the bonus game, and may be, determined by referring to a pay table 40 associated with the type of bonus game being, played. The same or different pay tables 40 may be used for the primary and bonus games.

Optionally, the player may be permitted to wager an additional amount on the bonus game before the bonus game is played.

Figure 5A:
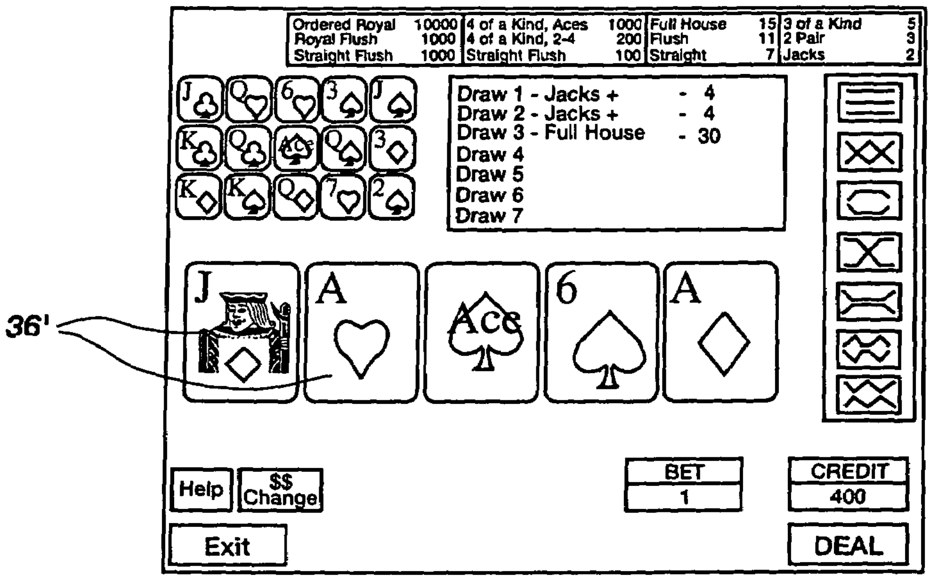
FIG. 5A is a schematic representation of another bonus game of the exemplary, poker embodiment of the methods illustrated in FIG. 4 and in FIGS. 4A–4B, wherein the bonus game is stud poker.

FIG. 5A illustrates a stud poker variation of the bonus game shown in FIGS. 5 and 6, wherein one or more cards 36' on the corresponding selected payline 35 from the primary game are replaced with another, previously unused card 36' from the deck. Alternatively, a new stud poker hand may be dealt from a "fresh" deck.

Referring again to FIG. 4, if, as shown, a trigger card 36T', in this case the "Ace of Spades", is present at a predetermined, specified trigger site 32T, here the image site 32 located at the center of array 30, another bonus event may be triggered. This additional bonus event may be triggered even if trigger site 32T is not located in a selected payline 35. The availability of this additional bonus event to a player may be dependent upon the player's placement of an additional wager. As one example of an additional bonus event, the presence of trigger card 36T' at trigger site 32T may result in an increase (e.g., doubling) of the winnings awarded during one or both of the primary game and any bonus games. If an additional wager is required to make this additional bonus event available, the amount any winnings are increased may depend on the additional amount of credits or tournament points wagered. As an alternative, a bonus game of draw poker or stud poker may be made available, either automatically or by choice, to the player, as described with reference to FIGS. 5, 5A, and 6.

While trigger card 36T' is depicted in FIG. 4 as being the "Ace of Spades", any other card 36' may be predetermined or preselected to be the trigger card. Similarly, although trigger site 32T is depicted as being the center image site 32 of array, any other image site 32 may be predetermined or preselected. As another alternative, more than one trigger card or trigger site may be selected if an additional amount is wagered by the player.

Figure 7:
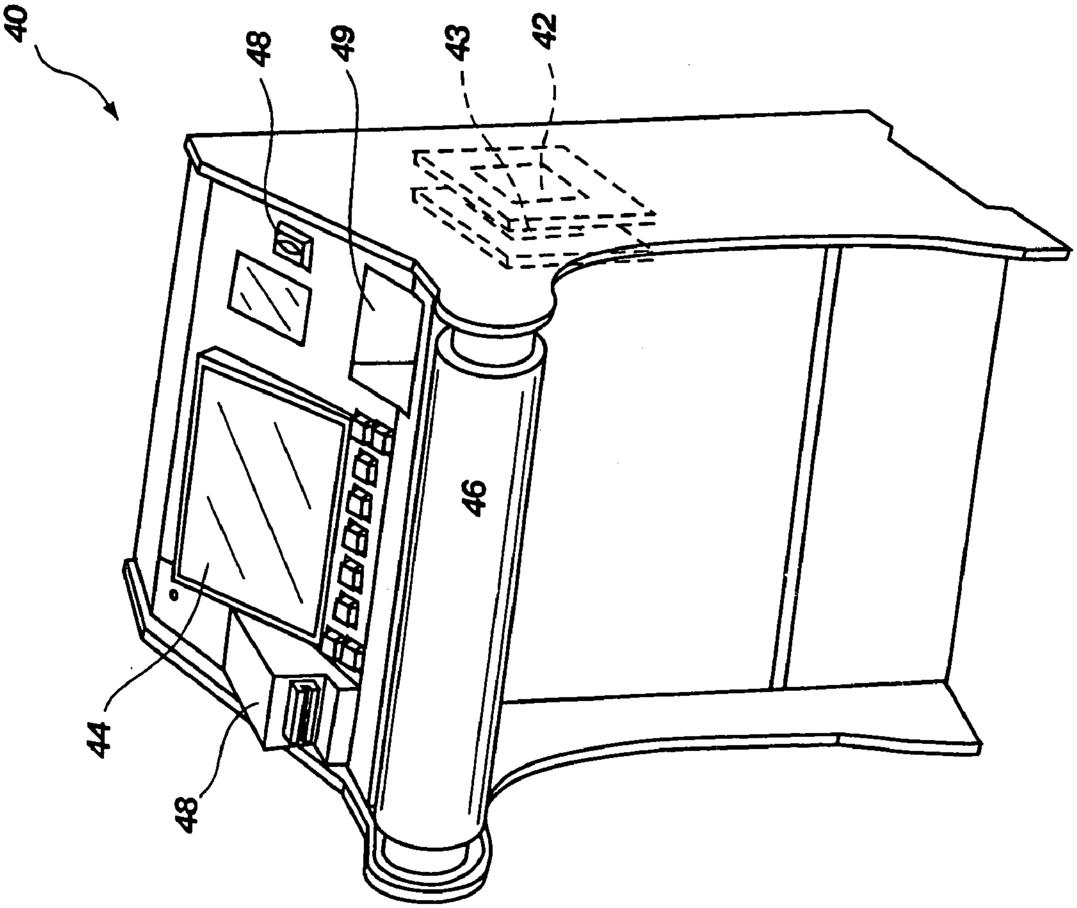
FIG. 7 is a schematic representation, in perspective view, of an exemplary gaming device by which the poker embodiment of the inventive method, depicted in FIGS. 4–6, may be effected.

An example of an electronic gaming device 40 in which the poker embodiment of the method of the present may be effected is illustrated in FIG. 7. Gaming device 40 includes one or more processors 42 under control of programming (e.g., software or firmware) that effects the method disclosed herein with reference to FIGS. 4–6. While a single processor 42 may be used in gaming device 40, different processors 42 may be used, for example, to effect the primary game and the bonus game. Each processor 42 communicates, as known in the art, by way of signals transported along carrier waves, with memory 43 of a known type, including read-only memory (ROM), random access memory (RAM), a hard drive, or CD-ROM, a display 44 of a known type (e.g., a cathode ray tube (CRT) monitor, a plasma monitor, a liquid crystal display, or other flat panel display, etc.), input elements 46 of a known type, such as the illustrated buttons or touch-sensitive locations on display 44, as well as with other known types of output devices, such as sirens, bells, whistles, other alarms, and audio devices. Data are input into and output from each processor 42 of gaming device 40 in accordance with the method of the present invention. Of course, gaming device 40 may also include one or more wagering input components 48 of known types, such as a currency receptacle, a credit or debit card reader, or a smart card reader, to permit a player to wager money on the games being played, as well as one or more payout components 49, as known in the art. The various elements of gaming device 40 and their association with each processor 42 and with one another are well known in the art.

As each processor 42 is under control of programming that effects the method of the present invention, the programming causes various logic circuits or groups of logic circuits of one or more processors 42 to execute various functions, or elements of the method. As used herein, the term "logic circuit" may encompass a single logic circuit of a processor 42 or a group of logic circuits of one or more processors 42 that together perform a specific function. Moreover, different logic circuits of one or more processors 42, as defined by a program or portion thereof, may utilize one or more of the same elements as other logic circuits of one or more processors 42.

In the exemplary embodiment described herein with reference to FIGS. 4–6, one logic circuit of processor 42 (FIG. 7) may identify selected paylines 35' upon placement of a wager thereon of the money credits or tournament points indicated by memory 43 (FIG. 7) to be available. Another logic circuit may randomly generate or "assign" cards 36' of a deck set to image sites 32' of an array 30'. Yet another logic circuit of processor 42 may determine whether a winning hand of cards 36' is present along any selected payline 35' and, if so, determine the corresponding award, while another logic circuit may cause the credit stored in memory 43 to be increased by an appropriate amount. Still another logic circuit may determine whether a bonus triggering event has occurred, either in or along a selected payline 35' or at a trigger site 32T'. Logic circuits of processor 42, under control of appropriate programming, may also effect the appropriate bonus events, including both bonus games and increases in awards, as well as other process elements that are within the scope of the present invention.

Figure 8:
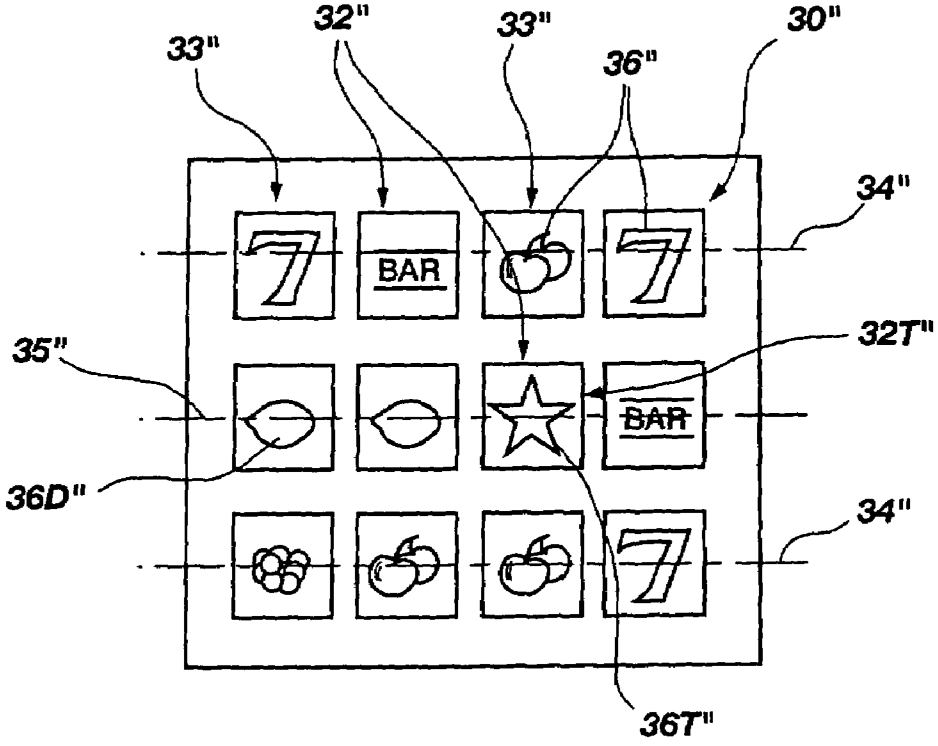
FIGS. 8 and 9 are schematic representations of another exemplary, reel type embodiment of the method of the invention.
Figure 9:
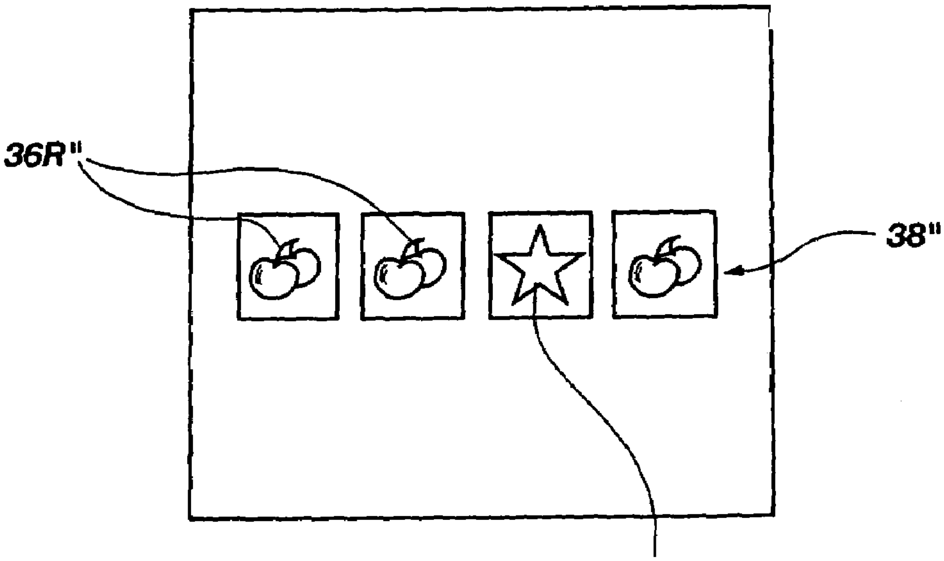

FIGS. 8 and 9 illustrate another exemplary embodiment of the present invention, wherein symbols 36" are of a type typically associated with a slot machine or other reel type gaming device. As illustrated in FIG. 8, an array 30" of image sites 32" includes several columns 33" of symbols 36". Each column 33" may be formed from the visible symbols 36" of a corresponding reel, which are the symbols that match up with image sites 32" of array 30" as the reel ceases independent "rotation" relative to the other reels that make up array 30". Each reel may include a fixed number of symbols 36" that are in a predetermined sequence, as on the mechanical reels of a conventional slot machine. Alternatively, the sequence of symbols on each reel may be randomly determined, as may the number of symbols that may be assigned to the image sites 32" of each column 33" of array 30". As another alternative, images from a predetermined set may be randomly assigned to image sites 32" of array 30". Preferably, a set of symbols 36" includes a fixed number of symbols 36", as well as a fixed number of each type of symbol 36".

In the primary game illustrated in FIGS. 8 and 9, a player selects one or more available paylines 34" along array 30", which are referred to as "selected" paylines 35". A payline 34" may be selected, as known in the art, for example, by placing a wager of money, money credits, or tournament points thereon. Once a player indicates that all of the desired paylines 34" have been selected, symbols 36" are randomly assigned to each image site 32" of array 30".

After each image site 32" of array 30" has a symbol 36" assigned thereto, each selected payline 35" across array 30" is evaluated to determine whether it includes a winning combination of symbols 36". For example, in a reel type game with four columns 33", a winning combination may include four of the same symbols 36" along a selected payline 35" or a combination including a "wild" symbol 36" and one other type of symbol 36" along a selected payline. Optionally, similar, three-image site 32" combinations may also comprise lesser winning combinations, for which a lesser award would be granted to the player.

If a particular, predetermined or prespecified (e.g., by the player) trigger symbol 36T" is present in a selected payline 35", play may proceed to a bonus round. Entry into the bonus round may be automatic, or may be optional to the player. If entry into the bonus round is optional, in order to play the bonus game, the player may be required to make an additional wager or to contribute all or part of an award from at least the corresponding selected payline(s) 35" of the primary game (i.e., each selected payline in which trigger symbol 36T" was present). As an alternative to the use of a single trigger symbol, another predetermined or preselected triggering event, such as the presence of a certain combination of symbols 36" along a selected payline 35", may qualify the player for a bonus round.

As depicted in FIG. 9, at least one symbol 36" from the corresponding selected payline 35" of the primary game is replaced with a randomly selected replacement symbol 36R". A player may be given the option to hold over one or more symbols 36" from the corresponding selected payline 35" (FIG. 8) to the bonus payline 38". Alternatively, a new, replacement symbol 36R" may be randomly assigned to each image site 32" of bonus payline 38". Replacement symbol 36R" may be a previously undisplayed symbol from the set of symbols that was previously used in the primary game. Alternatively, replacement symbol 36R" may comprise a previously displayed symbol, such as a symbol of the same, recirculated reel that displayed the discarded symbol 36D" (FIG. 8). As another alternative, replacement symbol 36R" may be selected from a new set of symbols 36". Of course, the amount of award or the amount of increase in award granted to the player is based upon the combination of symbols 36" that appears along bonus payline 38".

Referring again to FIG. 8, if a predetermined or preselected (e.g., player selected) trigger symbol 36T" appears at a predetermined or prespecified (e.g., player-selected) trigger site 32T" of array 30", the player may be awarded another bonus event. As one example of an additional bonus event, the award provided to the player based upon the results of each primary game and/or any-bonus games may be increased (e.g., doubled). In another example of an additional bonus event, the player may be awarded a bonus round, such as that described previously herein with reference to FIG. 9.

Figure 10:
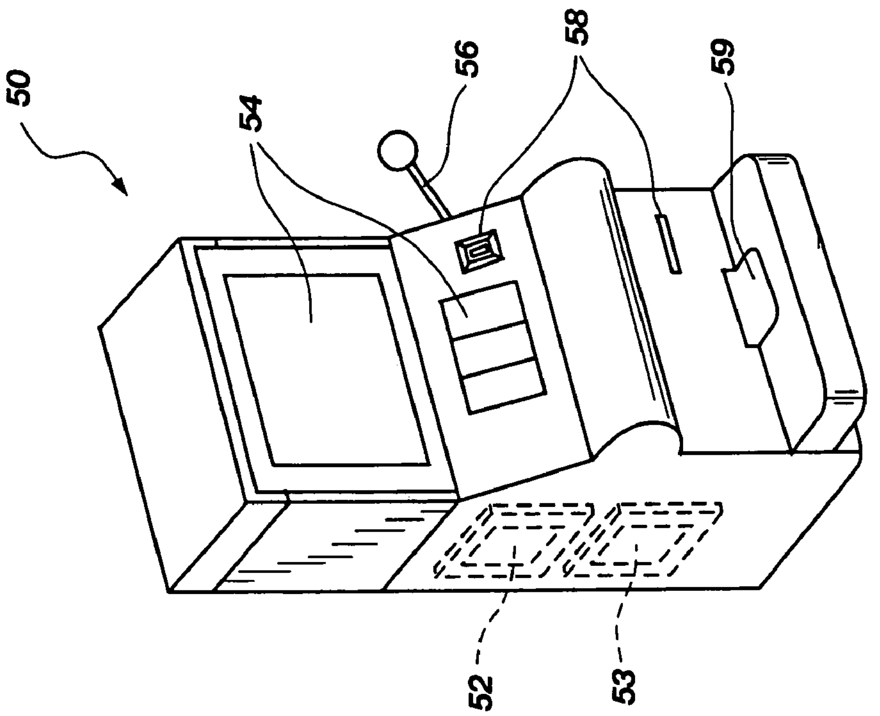
FIG. 10 is a schematic representation, in perspective view, of another exemplary gaming device by which the reel type embodiment of the inventive method, depicted in FIGS. 8 and 9, may be effected.

Turning now to FIG. 10, another exemplary embodiment of gaming device 50 incorporating teachings of the present invention is depicted. Gaming device 50 effects the reel type gaming method described herein with reference to FIGS. 8 and 9. Accordingly, gaming device 50 may be either an electronic device or an electro mechanical device.

Gaming device 50 includes one or more processors 52 under control of programming (e.g., software or firmware) that effects the method disclosed herein with reference to FIGS. 8 and 9. While a single processor 52 may be used in gaming device 50, different processors 52 may be used, for example, to effect the primary game and the bonus game. Each processor 52 communicates, by way of signals transported along carrier waves, with memory 53 of a known type, including read-only memory (ROM), random access memory (RAM), a hard drive, a CD-ROM, or the like, a display 54 of a known type (e.g., a cathode ray tube (CRT) monitor, a plasma monitor, a liquid crystal display, or other flat panel display, etc. in an electronic device or mechanical reels in an electro mechanical device), input elements 56 of a known type, such as the illustrated lever, or pull arm, and buttons or touch-sensitive locations on an electronic display 54, as well as with other known types of output devices, such as bells, whistles, other alarms, and audio devices. Of course, gaming device 50 may also include one or more wagering input components 58 and payout components 59 of known types. The various ways in which the various elements of gaming device 50 may be associated with processor 52 and with each other are well known in the art.

The programming that controls processor 52 causes various logic circuits or groups of logic circuits of processor 52 to execute various functions, or elements of the inventive method. In the exemplary reel type embodiment of the inventive method, which is described herein with reference to FIGS. 8 and 9, one logic circuit of processor 52 (FIG. 10) may identify selected paylines 35" as a wager of the money credits or tournament points indicated by memory 53 (FIG. 7) to be available is placed thereon. Another logic circuit may randomly assign symbols 36" of a predetermined set to image sites 32" of array 30" or cause adjacent reels with series of symbols 36" thereon to spin and stop in random positions, with the shown, adjacent symbols 36" of each reel forming a column of symbols 36" of array 30". Yet another logic circuit of processor 52 may determine whether a winning combination of symbols 36" is present along any selected payline 35" and, if so, determine the corresponding award, while another logic circuit may cause the amount credit stored in memory 53 to be increased accordingly. Still another logic circuit may determine whether a bonus triggering event has occurred, either in or along a selected payline 35" or at a trigger site 32T". Logic circuits of processor 52, under control of appropriate programming, may also effect the appropriate bonus events, including both bonus games and increases in awards, as well as other elements of the inventive methods.

Figure 11:
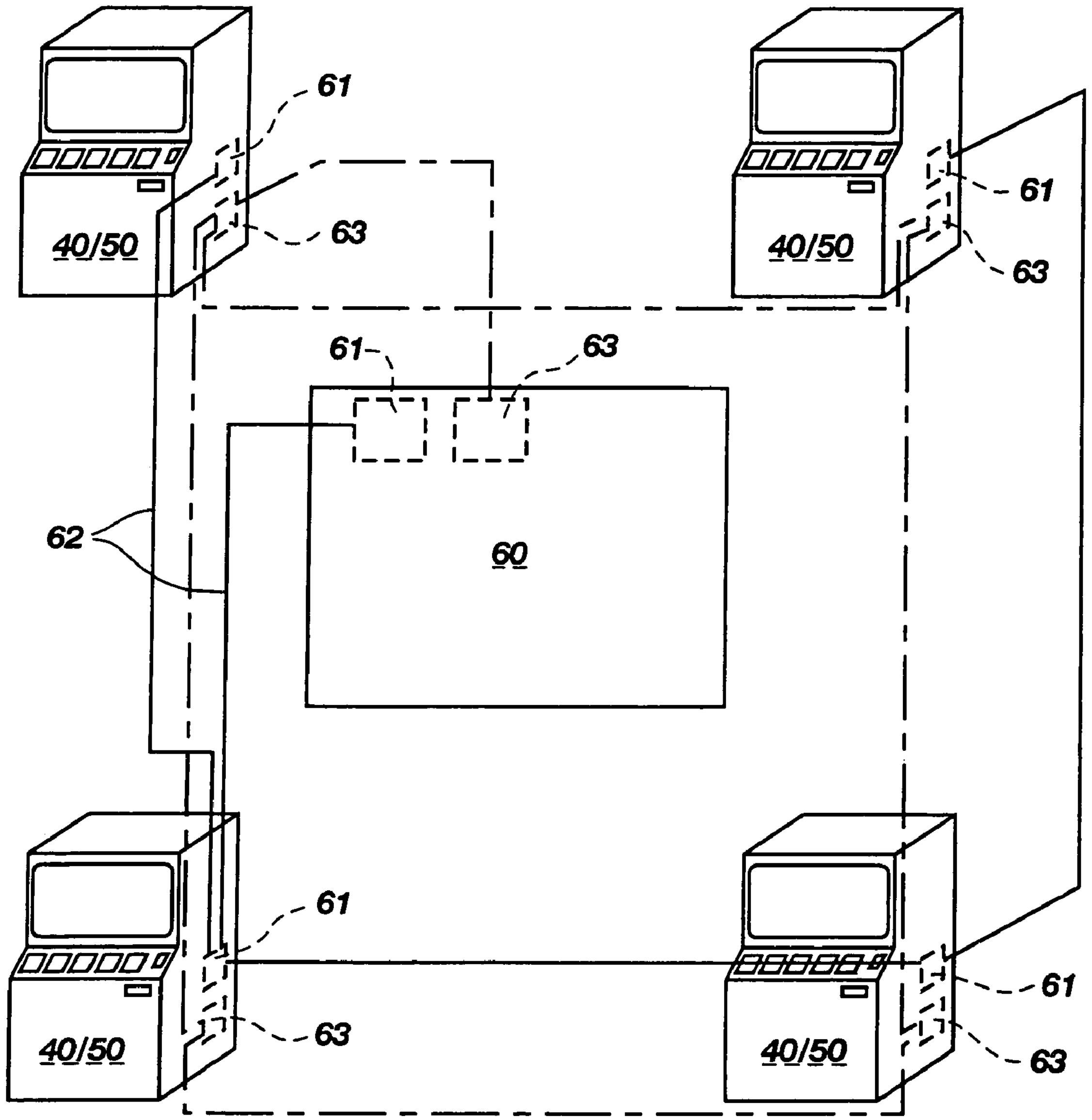
FIG. 11 is a schematic representation of a gaming system incorporating teachings of the present invention.

The apparatus illustrated in FIGS. 7 and 10 may comprise stand-alone gaming devices 40, 50 or stand-alone computers, or may (see FIG. 11) be networked to a central computer 60 (e.g., a server or game controlling computer) of a casino, or directly to other gaming devices 40, 50, by way of a network card 61 and appropriate links 62 therefor (i.e., a local area network (LAN)), by use of a modem or other communication component that facilitates the use of broadband telecommunications between gaming devices 40, 50 or of gaming devices 40, 50 with a central computer 60 (i.e., a wide area network (WAN) or the World-Wide Web (WWW)), or otherwise, as known in the art. Accordingly, gaming devices 40, 50 may be linked to a central computer 60 and/or other gaming devices 40, 50 that are located at the same site or at remote sites (e.g., in other casinos or even other geographic locations). Exemplary ways in which gaming devices 40, 50 may be linked to one another are described in co-pending U.S. application Ser. No. 09/675,829, filed on Sep. 29, 2000 (which discloses linking gaming devices for the purpose of tournament play), and in U.S. Pat. No. 6,039,648, the disclosures of each of which are hereby incorporated in their entireties by this reference.

Although the foregoing description contains many specifics, these should not be construed as limiting the scope of the present invention, but merely as providing illustrations of some of the presently preferred embodiments. Similarly, other embodiments of the invention may be devised which do not depart from the spirit or scope of the present invention. Moreover, features from different embodiments of the invention may be employed in combination. The scope of the invention is, therefore, indicated and limited only by the appended claims and their legal equivalents, rather than by the foregoing description. All additions, deletions, and modifications to the invention, as disclosed herein, which fall within the meaning and scope of the claims are to be embraced thereby.

What is claimed is:

1. A gaming method comprising:

allowing a play to make at least one wager;

allowing said player to select at least one payline;

allowing said player to select a single trigger site, said single trigger site being any image site of an array of image sites;

displaying symbols on said array of image sites in a primary game;

determining whether plurality of winning combinations of symbols is present along said at least one payline within said array;

awarding a payout if said one of a plurality of winning combinations of symbols is present along said at least one payline;

determining whether one of a trigger symbol and a triggering combination of symbols is present along at least one payline;

providing one of a bonus event and an option of initiating a bonus event if one of said trigger symbol and said triggering combination of symbols is present along at least one payline;

determining whether a trigger symbol is present at said trigger site; and providing one of an additional bonus event and an option of initiating an additional bonus event based solely on the determination if said trigger symbol is present at said single trigger site.

2. The gaming method of claim 1, further comprising allowing a player to select one paylines on the array of image sites and allowing the player to indicate that the selection of paylines is complete, prior to displaying the symbols on the array of image sites.

3. The gaming method of claim 1, further comprising allowing a player to select said trigger symbol prior to displaying the symbols on the array of image sites.

4. The gaming method of claim 1, wherein said providing said bonus event comprises:

displaying symbols on image sites of a bonus payline; and determining whether one of a plurality of winning combinations of symbols is present along said bonus payline.

5. The gaming method of claim 1, wherein symbols displayed on said array of image sites include symbols representing card from a deck of cards.

6. The gaming method of claim 1, wherein said determining whether one of said plurality of winning combinations of symbols is present comprises determining whether at least one specific poker combination is present along said least one payline.

7. The gaming method of claim 1, wherein said symbols displayed on said array of image sites includes reel type slot machine symbols.

8. A gaming method, comprising:

allowing a player to select a single trigger site, said single trigger site being any image sites of an array of image sites;

displaying symbols on said array of image sites;

determining whether one of a plurality of winning combinations of symbols is present in at least one selected payline within said array;

determining whether a first triggering event is preset least one selected payline within said array; and determining whether a second triggering event is present at said single trigger site.

9. The gaming method of claim 8, wherein said displaying symbols comprises randomly assigning symbols each presenting a card from a deck of cards to said array of image sites.

10. The gaming method of claim 8, wherein said determining whether one of said plurality of winning combinations of symbols is present comprises determining whether at least one specific poker combination is present along said at least one selected payline within said array.

11. The gaming method of claim 8, wherein said determining whether said first triggering event is present comprises determining whether a trigger symbol is present along said at least one selected payline.

12. The gaming method of claim 8, wherein said determining whether said first triggering event is present comprises determining whether a triggering combination of symbols is present t least one selected payline.

13. The gaming method of claim 8, wherein said determining whether said second triggering event is present comprises determining whether a trigger symbol is present at said trigger site.

14. The gaming method of claim 13, further comprising initiating a bonus event if said second triggering event occurs.

15. The gaming method of claim 14, wherein said initiating a bonus event comprises increasing an award if one of said plurality of winning combinations of symbols is present along said at least one selected payline.

16. The gaming method of claim 13, wherein said displaying symbols on said array of image sites includes displaying symbols selected from a set of symbols, and further comprising displaying symbols in said bonus event, wherein said symbols displayed during the bonus event are also selected from said set of symbols.

17. The gaming method of claim 8, wherein said determining whether one of said plurality of winning combinations of symbols is present comprises determining whether one of said plurality of winning combinations of symbols is present along said at least one payline selected in response to placement of a wager thereon.

* * * * *

UNITED STATES PATENT AND TRADEMARK OFFICE

CERTIFICATE OF CORRECTION

PATENT NO. : 7,166,028 B2 
APPLICATION NO. : 10/852830
DATED : January 23, 2007
INVENTOR(S) : Dustin L. Fasbender et al.

It is certified that error appears in the above-identified patent and that said Letters Patent is hereby corrected as shown below:

<u>In the Claims:</u>

At Column 11, line 46, claim 1 “whether plurality” should be --whether one of a plurality --.

At Column 11, line 59, claim 1 “said trigger” should be -- said single trigger --.

At Column 11, line 66, claim 2 “one paylines” should be -- one or more paylines --.

At Column 12, line 1, claim 2 “of paylines” should be -- of one or more paylines --.

At Column 12, line 12, claim 5 “wherein symbols” should be -- wherein said symbols --.

At Column 12, line 14, claim 5 “card” should be -- cards --.

At Column 12, line 18, claim 6 “said least” should be -- said at least --.

At Column 12, line 31, claim 8 “preset least” should be -- present in said at least --.

At Column 12, line 36, claim 9 “presenting” should be -- representing --.

At Column 12, line 51, claim 12 “present t least” should be -- present along said at least --.

At Column 12, line 61, claim 15 “a bonus” should be -- said bonus --.

Signed and Sealed this

Fourteenth Day of August, 2007

JON W. DUDAS
*Director of the United States Patent and Trademark Office*